Dec. 7, 1937.   J. H. DAVIDSON   2,101,362
HACKSAW
Filed March 30, 1936
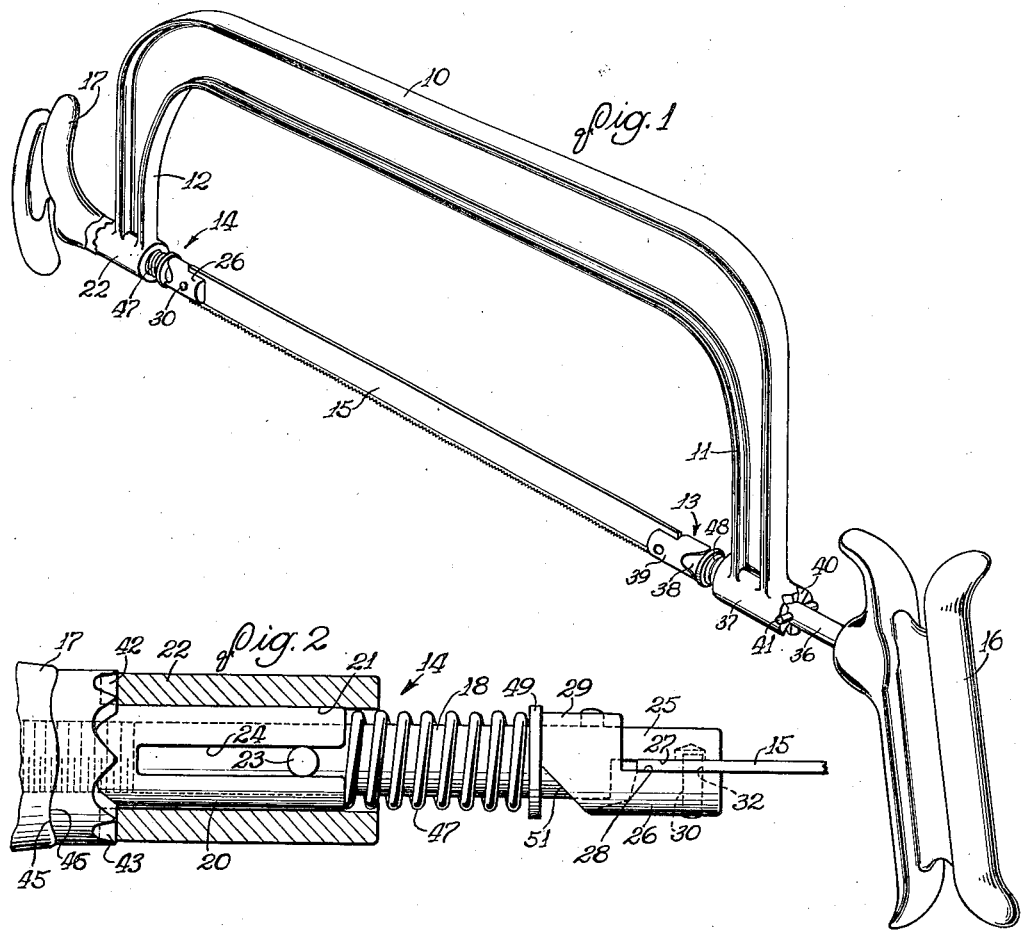
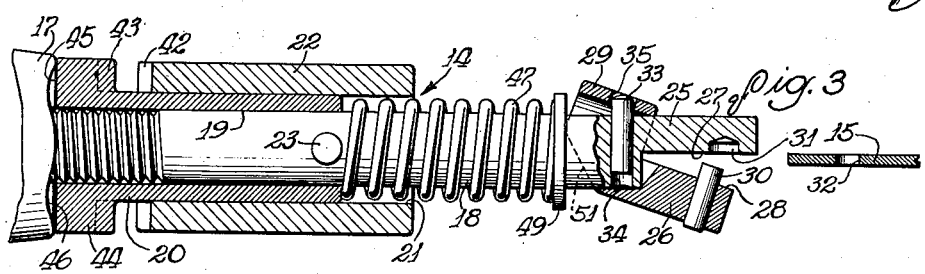
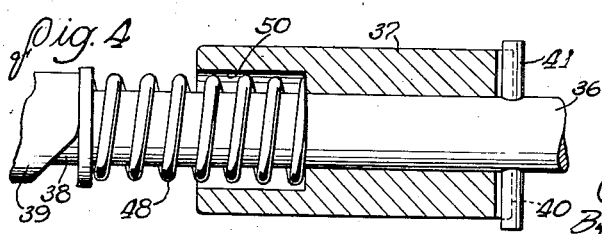
INVENTOR
Jack H. Davidson
ATTORNEYS

Patented Dec. 7, 1937

2,101,362

UNITED STATES PATENT OFFICE 2,101,362

HACKSAW

Jack H. Davidson, Chicago, Ill., assignor to Armstrong-Blum Mfg. Co., Chicago, Ill., a corporation of Illinois Application March 30, 1936, Serial No. 71,565

7 Claims. (Cl. 145—33)

My invention relates to hack saws and particularly to saws in which the blade is mounted for angular adjustment with relation to the frame.

It is an object of my invention to provide a hack saw having an improved clamping arrangement for detachably mounting a blade on a suitable frame and for preventing disengagement between the blade and the clamping arrangement while altering the angular adjustment of the blade with respect to the frame.

Mor specifically it is an object of my invention to provide an improved hack saw having blade holders mounted on the opposite ends of a U-shaped frame adapted to utilize the tension exerted thereby on the blade to clamp the ends of the blade, and including an arrangement for maintaining the clamping members in clamping engagement with the blade while altering the angular adjustment thereof.

Another object of my invention is to provide an improved hack saw blade holder including an arrangement for selectively maintaining the same either in or out of clamping engagement with the blade irrespective of the tension in the blade, and which is adapted to utilize the tension in the blade to increase the clamping pressure thereon when moved into clamping engagement with the blade.

Another object of my invention is to provide an improved blade holder for hack saws which is capable of clamping the end portion of a blade in response to relative longitudinal movement of the blade holder and the blade, and which is adapted to exert a predetermined minimum clamping pressure on the end portion of the blade irrespective of relative movement between the blade holder and the blade, thus facilitating angular adjustment thereof.

Further objects and advantages of my invention will become apparent as the following description proceeds and the features of novelty which characterize my invention are pointed out with particularity in the claims annexed to and forming a part of this specification.

For a better understanding of my invention, reference may be had to the accompanying drawing in which, Figure 1 is a perspective view of a hand hack saw, embodying my invention.

Fig. 2 is an enlarged detail view, partly in section, of the rear clamping member for the saw shown in Fig. 1, the clamping member being shown in clamping engagement with the end portion of the saw blade.

Fig. 3 is a sectional view of the clamping member shown in Fig. 2, the clamping member being shown in its open position disengaged from the saw blade, and Fig. 4 is an enlarged detail view partly in section of the front clamping member of the saw shown in Fig. 1.

Referring to the drawing, I have shown in Fig. 1 a hand hack saw, embodying my invention, which includes a U-shaped frame 10, preferably made of cast metal, and having front and rear arms 11 and 12. Blade holders, generally designated by the numerals 13 and 14, are mounted in alinement on the lower ends of the arms 11 and 12 respectively and are adapted to clamp the opposite ends of a saw blade 15. Associated with the respective blade holders 13 and 14 are front and rear handles 16 and 17. The blade holders 13 and 14 are adapted to be moved longitudinally with respect to the blade 15 thus placing the same under tension. In the preferred arrangement illustrated the blade holders include clamping members operative as an incident to an increase in tension in the blade to grip the blade with increasing pressure.

As shown in Figs. 2 and 3, the rear blade holder 14 includes a longitudinally movable stem 18 herein shown as cylindrical in form and slidably mounted in a longitudinally extending bore 19 formed in a bushing 20. The hollow bushing 20 is in turn slidably mounted in a bore 21 formed in a cylindrical head 22, which is integral with the end portion of the rear arm 12. A pin 23 extends laterally from the side of the stem 18 into a slot 24 formed in the side of the bushing 20 and thus prevents relative rotation between the bushing 20 and stem 18 while at the same time permitting relative longitudinal movement therebetween.

At the inner end of the stem 18, a clamp is provided having a fixed jaw 25 and a movable jaw 26. As shown herein the two jaws 25 and 26 are substantially semi-circular in cross section and respectively provide flat clamping surfaces 27 and 28. In mounting the movable jaw for movement relative to the fixed jaw, a pivotal connection is employed and for this purpose the body portion of the movable jaw has formed integral therewith an annulus 29 loosely encircling the stem 18. The jaw proper is offset to one side of the axis of the annulus for cooperation with the stationary jaw 25, which is similarly offset to one side of the stem 18 but in a direction opposite to the movable jaw 26. A blade anchoring element in the form of a pin 30 is mounted in the movable jaw and projects from the clamping surface 28 thereof being adapted to enter a recess 31 in the stationary jaw. As shown in Fig. 2, the saw blade 15 is provided with an aperture 32 therein through which the pin 30 extends when the jaws 25 and 26 are disposed in clamping relation with the end portion of the blade.

The movable jaw 26 is pivotally connected to the stem 18 by a hardened steel pin 33 which is press fitted in a transverse hole 34 formed in the stem 18, and which projects laterally therefrom on the side of the stem opposite the main portion of the movable clamping jaw 26. The outer end of the pin 33 extends into a hole 35 formed in the outer side of the annulus 29. The hole 35 is of such size and shape as to permit rocking of the annulus relative to the stem and thereby a limited pivotal movement of the movable jaw 26 relative to the fixed jaw 25.

It will be observed that the pivot point of the movable jaw is offset laterally from the point of connection of the anchoring element with the saw blade 15. Accordingly, a force tending to move the stem 18 and blade 15 longitudinally with respect to each other will cause the movable jaw to swing toward the stationary jaw and the greater the magnitude of such force the greater will be the clamping pressure exerted between the jaws.

The blade holder 13 at the front end of the saw is provided with a movable and fixed jaw clamping arrangement substantially identical with that of the blade holder 14 and consequently, it need not be described in detail. In general, the blade holder 13 includes a cylindrical stem 36 arranged in alinement with the stem 18 and is longitudinally slidable in a bore formed in a cylindrical head 37, which is integral with the lower end of the front arm 11. The manual operating handle 16 is rigidly secured to the outer end of the stem 36. A fixed jaw 38 formed on the stem 36 cooperates with a movable jaw 39 pivotally mounted thereon to clamp the adjacent end of the blade 15, the jaws 38 and 39 being identical in construction with the jaws 25 and 26 described above.

I have provided an arrangement for adjusting the angular position of the blade 15 about its longitudinal axis in order that it may be maintained in various angular positions with respect to the frame 10. This arrangement includes a series of radially extending teeth 40 formed on the front face of the cylindrical head 37 which are adapted to engage a laterally extending pin 41 press fitted in a hole formed in the stem 36. The angular adjustment arrangement also includes a similar series of radially extending teeth 42 formed on the rear face of the cylindrical head 22 which mesh with a series of complementary radially extending teeth 43, formed on the front face of a head 44 on the bushing 20.

In tensioning and positioning the blade 15, its opposite ends are first placed between the jaws 25, 26 and 38, 39 and these jaws are closed. The blade 15 and stems 18 and 36 are then rotated to the desired angular position, after which the blade is tensioned by rotating the rear handle 17, which is threaded on the rear end of the stem 18. As the handle 17 is thus screwed onto the stem 18, the latter moves longitudinally outward through the bore 21 formed in the cylindrical head 22, thus tensioning the blade 15 and increasing the clamping pressure exerted by the jaws on the ends of the blade, as described above. At the same time, the pin 41 is pulled tightly into engagement with the teeth 40, and the teeth 43 on the bushing head 44 are similarly forced into firm engagement with the teeth 42 by the pressure of the adjacent portion of the handle 17. For the purpose of holding the parts in adjusted relation, the rear face 45 of the bushing head 44 and adjacent face 46 of the handle 17 are corrugated to provide coacting cam faces. Thus, when the blade is under tension, a yieldable frictional resistance is interposed sufficient to hold the handle 17 against rotation.

In accordance with my invention, I have provided an arrangement for maintaining the clamping jaws of the blade holders 13 and 14 in clamping engagement with the ends of the blade 15, even when the handle 17 is retracted to the position shown in Fig. 3, thus relieving the tension in the blade 15. As a consequence the blade 15 may be readily maintained in position while adjusting the angular relation thereof with respect to the frame. This arrangement preferably includes helical compression springs 47 and 48 which surround the stems 18 and 36, respectively. As shown in Figs. 2 and 3, the compression spring 47 is interposed between the adjacent ends of the bushing 19 and the annulus 29. A washer 49 is preferably positioned between the end of the spring 47 and adjacent flat face of the annulus 29 and a similar washer is positioned at the inner end of the spring 48. It will thus be seen that the spring 47 serves to releasably maintain the movable jaw 26 in its clamping position shown in Fig. 2 so that a predetermined minimum clamping pressure is maintained between the jaws 25 and 26, even when the handle 17 is moved to its released position thereby relieving the tension in the blade. Similarly, the spring 48 bears against the rear face of the movable jaw 39, the other end of the spring 48 being arranged to bear against the bottom wall of a counter bore 50 formed in the cylindrical head 37. The spring 48 thus maintains the jaws of the front blade holder 13 in clamping relation with the blade 15 even when the tension in the latter is released.

In adjusting the angular position of the blade 15 the handle 17 is first unscrewed along the stem 18 a short distance thus relieving the heavy clamping pressure exerted thereby which normally holds the teeth 42 and 43 as well as the teeth 40 and pin 41 locked in engagement. The pin 41 and teeth 40 are, however, still held lightly in engagement by the compression of the spring 48. The pressure of the spring 48 is light enough that the handle 16 may be rotated thus camming the pin 41 over the teeth 40 and turning the blade 15 to the desired angular position. The handle 17 is backed off a sufficient distance that the teeth 42 and 43 are disengaged thus allowing the rear end of the blade to turn upon rotation of the handle 16. It will thus be seen that the spring 48 not only serves to hold the jaws 38 and 39 in open or closed position but also releasably holds the blade 15 in its desired angular position even when the locking handle 17 is backed-off.

As best shown in Figs. 2 and 3, the lower portion of the annulus 29 is cut away at an angle with respect to the rear face of the annulus so as to form an angularly disposed bearing surface 51. Consequently, when the movable jaw 26 is moved to the open position shown in Fig. 3, the washer 49 on the end of the spring 47 bears against the upper portion of the bearing surface 51 and releasably holds or cocks the jaw 26 in its open position. The movable jaw 39 of the front blade holder 13 is similarly formed so that the spring 48 may also be used to selectively maintain the jaws of the blade holders in either their open or their closed positions.

It will thus be seen that I have provided a hack saw of a very practical character, having blade holders of simple construction, which are capable of holding the blade effectively while in use and which are also readily adjustable to various angular positions. Moreover, the blade holders are adapted to maintain a predetermined minimum clamping pressure on the saw blade, even when the tension thereon is released in order to facilitate angular adjustment thereof.

Although I have shown a particular embodiment of my invention in connection with a hand hack saw, I do not desire to limit my invention to the particular construction shown and described and I intend in the appended claims to cover all modifications within the spirit and scope of my invention.

I claim as my invention:

1. A hack saw comprising a frame having front and rear arms, anchoring means for one end of a saw blade carried by one of said arms, the other of said arms having a bore extending therethrough, a hollow bushing mounted in said bore, a stem slidably mounted in said bore substantially in alinement with the blade and having a fixed clamping jaw rigid therewith, a movable clamping jaw hinged adjacent one end to said stem and having a blade anchoring member adjacent its other end, said movable jaw being swingable toward the fixed jaw as an incident to longitudinal movement of said stem away from the blade, means for preventing relative rotation between said bushing and said stem, means for releasably clamping said bushing against rotation of said bore in various selected positions therein, and means including a helical compression spring surrounding said stem and bearing against said bushing and said movable jaw for releasably preventing relative movement between said jaws irrespective of the movement of said stem.

2. A hack saw comprising a frame having front and rear arms, anchoring means for one end of a saw blade carried by one of said arms, the other of said arms having a bore extending therethrough, a hollow bushing mounted in said bore, a stem slidably mounted in said bore substantially in alinement with the blade and having a fixed clamping jaw rigid therewith, a movable clamping jaw hinged adjacent one end to said stem and having a blade anchoring member adjacent its other end, said movable jaw being swingable toward the fixed jaw as an incident to longitudinal movement of said stem away from the blade, means for preventing relative rotation between said bushing and said stem, engageable projections formed on adjacent surfaces of said other arm and said bushing, means including a manual operating handle threaded on said stem for moving said projections into a position of engagement and for moving said stem axially with respect to said blade, and means including a helical compression spring surrounding said stem and bearing against said bushing and said movable jaw for releasably preventing relative movement between said jaws irrespective of the movement of said stem.

3. A blade holder for hack saws comprising a stem having a fixed clamping jaw rigid therewith with a flat clamping face extending longitudinally from an end of said stem, a movable clamping jaw in opposed relation to the fixed jaw, a blade anchoring element carried by said movable jaw, an annulus loosely encircling said stem and carrying said movable jaw, said annulus having a pivotal connection with the stem on the side thereof opposite the movable jaw and having a pair of angularly disposed bearing surfaces on the rear end thereof, and means including a helical compression spring surrounding said stem and bearing alternatively against said bearing surfaces for releasably preventing relative movement between said jaws.

4. A blade holder for a hack saw comprising a stem having a fixed clamping jaw rigid therewith with a flat clamping face extending longitudinally from one end of said stem, a movable clamping jaw in opposed relation to the fixed jaw, a blade anchoring element carried by said movable jaw, an annulus loosely encircling said stem and carrying said movable jaw, said annulus having a pivotal connection with the stem on the side thereof opposite the movable jaw and having a pair of angularly disposed bearing surfaces on the rear portion thereof, and means including a helical compression spring surrounding said stem and adapted to bear alternatively against one of said angularly disposed bearing surfaces for selectively maintaining said jaws in their open and closed positions.

5. A hack saw comprising a frame having front and rear arms, anchoring means for one end of a saw blade carried by one of said arms, the other of said arms having a bore extending therethrough, a stem slidably and rotatably mounted in said bore substantially in alinement with the blade and having a fixed clamping jaw rigid therewith, a movable clamping jaw hinged adjacent to one end of said stem and having a blade anchoring member adjacent its other end, said movable jaw being swingable toward the fixed jaw as an incident to longitudinal movement of said stem away from the blade, engageable projections formed on adjacent surfaces of said other arm and said stem, and means including a helical compression spring surrounding said stem and interposed between said movable jaw and said other arm for releasably maintaining said projections in engagement and for releasably preventing relative movement between said jaws irrespective of the movement of said stem.

6. A blade holder for hack saws comprising, a stem having a fixed clamping jaw rigid therewith with a flat clamping face extending longitudinally from an end of said stem, a movable clamping jaw in opposed relation to the fixed jaw, an annulus loosely encircling said stem and carrying said movable jaw, said annulus having a pivotal connection with the stem on the side thereof opposite said movable jaw, said movable jaw and annulus assembly having a pair of angularly disposed bearing surfaces on the rear end thereof, and means including a helical compression spring surrounding said stem and bearing alternatively against said bearing surfaces for releasably preventing relative movement between said jaws.

7. A blade holder for hack saws comprising, a stem having a fixed clamping jaw rigid therewith with a flat clamping face extending longitudinally from an end of said stem, a movable clamping jaw in opposed relation to the fixed jaw, means for pivotally supporting said movable jaw for movement toward and away from said fixed jaw, said movable jaw having a pair of angularly disposed bearing surfaces on the rear end thereof, and means including a helical compression spring surrounding said stem and bearing alternatively against said bearing surfaces for releasably preventing relative movement between said jaws.

JACK H. DAVIDSON.